US008177645B2

(12) United States Patent
Walker et al.

(10) Patent No.: US 8,177,645 B2
(45) Date of Patent: May 15, 2012

(54) METHODS AND APPARATUS FOR PROVIDING COMMUNICATIONS SERVICES AT A GAMING MACHINE

(75) Inventors: Jay S. Walker, Ridgefield, CT (US); James A. Jorasch, Stamford, CT (US); Russell P. Sammon, San Francisco, CA (US)

(73) Assignee: IGT, Reno, NV (US)

( * ) Notice: Subject to any disclaimer, the term of this patent is extended or adjusted under 35 U.S.C. 154(b) by 1709 days.

(21) Appl. No.: 11/456,459

(22) Filed: Jul. 10, 2006

(65) Prior Publication Data

US 2006/0252549 A1 Nov. 9, 2006

Related U.S. Application Data

(63) Continuation of application No. 10/420,118, filed on Apr. 21, 2003, now abandoned.

(60) Provisional application No. 60/374,436, filed on Apr. 19, 2002.

(51) Int. Cl.
*A63F 9/24* (2006.01)
*A63F 13/00* (2006.01)

(52) U.S. Cl. ................. 463/42; 463/25; 463/40; 463/41

(58) Field of Classification Search .................... 463/25, 463/40–42
See application file for complete search history.

(56) References Cited

U.S. PATENT DOCUMENTS

| | | | | | |
|---|---|---|---|---|---|
| 4,518,823 | A | | 5/1985 | Kessler | 379/93.07 |
| 4,760,527 | A | | 7/1988 | Sidley | 364/412 |
| 5,018,021 | A | | 5/1991 | Slater | 358/349 |
| 5,179,517 | A | | 1/1993 | Sarbin et al. | 364/410 |
| 5,251,302 | A | | 10/1993 | Weigl et al. | 395/250 |
| 5,259,613 | A | | 11/1993 | Marnell, II | 273/138 |
| 5,276,312 | A | | 1/1994 | McCarthy | 235/380 |
| 5,321,241 | A | | 6/1994 | Craine | 235/380 |
| 5,429,361 | A | | 7/1995 | Raven et al. | 273/138 |
| 5,456,648 | A | | 10/1995 | Edinburg et al. | 482/4 |
| 5,586,937 | A | | 12/1996 | Menashe | 463/41 |
| 5,611,729 | A | | 3/1997 | Schumacher et al. | 463/18 |
| 5,624,316 | A | | 4/1997 | Roskowski et al. | 473/45 |
| 5,655,961 | A | | 8/1997 | Acres et al. | 463/27 |
| 5,755,621 | A | | 5/1998 | Marks et al. | 463/42 |
| 5,770,533 | A | | 6/1998 | Franchi | 463/42 |
| 5,909,486 | A | | 6/1999 | Walker et al. | 379/144 |
| 5,971,271 | A | | 10/1999 | Wynn et al. | 235/380 |
| 5,984,780 | A | | 11/1999 | Takemoto et al. | 463/20 |
| 5,984,783 | A | | 11/1999 | Kikuchi et al. | 463/25 |
| 6,113,495 | A | | 9/2000 | Walker et al. | 463/42 |
| 6,139,431 | A | * | 10/2000 | Walker et al. | 463/20 |

(Continued)

OTHER PUBLICATIONS

"Installing Device's Modem". www.waterwheel.com/Guides/how_to/modem/modems.htm. 4 pgs.

(Continued)

*Primary Examiner* — Peter DungBa Vo
*Assistant Examiner* — Jasson Yoo
(74) *Attorney, Agent, or Firm* — K&L Gates LLP

(57) ABSTRACT

In a first aspect, a method is provided that includes the steps of (1) providing an auxiliary unit adapted to allow a gaming machine to be retrofitted to provide communications services; and (2) retrofitting a non-communications-enabled gaming machine with the auxiliary unit so that the non-communications enabled gaming machine is adapted to provide communications services based on game play at the non-communications-enabled gaming machine. Numerous other aspects are provided.

26 Claims, 6 Drawing Sheets

U.S. PATENT DOCUMENTS

| | | | | |
|---|---|---|---|---|
| 6,154,131 | A * | 11/2000 | Jones et al. | 340/540 |
| 6,229,879 | B1 | 5/2001 | Walker et al. | 379/114 |
| 6,327,351 | B1 | 12/2001 | Walker et al. | 379/144 |
| 6,641,484 | B2 | 11/2003 | Oles et al. | 463/47 |
| 6,722,985 | B2 | 4/2004 | Criss-Puszkiewicz et al. | 463/29 |
| 6,755,741 | B1 | 6/2004 | Rafaeli | 463/25 |
| 6,955,601 | B2 | 10/2005 | Seelig et al. | 463/20 |
| 2002/0094869 | A1 * | 7/2002 | Harkham | 463/42 |
| 2002/0196342 | A1 | 12/2002 | Walker et al. | 463/20 |
| 2003/0054868 | A1 * | 3/2003 | Paulsen et al. | 463/1 |
| 2003/0078094 | A1 * | 4/2003 | Gatto et al. | 463/25 |

OTHER PUBLICATIONS

"Internet Archive Wayback Machine". web.archive.org/web/*/http://www.waterwheel.com/Guides/how_to/modem/modems.htm. 1 pg.
US Robotics Networking for Dummies: www.usr.com/education/dummies/dummies-template.asp?url=index.html . 14 pgs.
U.S. Examiner's Office Action dated Jun. 27, 2007, U.S. Appl. No. 10/420,118, filed Apr. 21, 2003 31 pgs.
"On the Light Side", The Associated Press, May 27, 1989, Section: Domestic News.
Finnigan, David, "'Call Girls' Wow 'Em at Gaming Confab", Las Vegas Business Press, Oct. 7, 1991, Section: vol. 8, No. 36, Sec. 1, p. 1.
"Mirage Resorts. Incorporated Licenses Video Conferencing Technology From C-Phone Corporation: C-Phone Hardware and Software Drives State-of-the-Art Video Customer Service Network in Slot Machines at Treasure Island", PR Newswire, Jan. 15, 1997, Section: Financial News.
Website: "Mobile Payment—Mobile Entertainment", (http //www hirc gr/events/infra/to/IT-TO-IRE-19.doc), download date: Sep. 30, 2003.

* cited by examiner

METHODS AND APPARATUS FOR PROVIDING COMMUNICATIONS SERVICES AT A GAMING MACHINE

The present application is a continuation of U.S. patent application Ser. No. 10/420,118, filed Apr. 21, 2003, now abandoned entitled "METHODS AND APPARATUS FOR PROVIDING COMMUNICATIONS SERVICES AT A GAMING MACHINE"; which claims priority from U.S. Provisional Patent Application No. 60/374,436, filed Apr. 19, 2002 and titled "Gaming Devices Method and Apparatus for Regulatory Access".

Each of the above-referenced applications is incorporated by reference herein in its entirety.

BACKGROUND OF THE INVENTION

Within the casino/gaming industry, slot machines typically generate most of the profits realized by casino owners and operators. For this reason, numerous slot machine types and formats have been developed and are employed within casinos (e.g., slot machines having a variety of display formats for the reels or other game features of the slot machines, larger jackpots, etc.). By providing a large variety of slot machines, casino owners and operators may appeal to a larger audience, and acquire and retain slot machine players.

Despite a variety of available options, conventional slot machines may still lack sufficient entertainment value to attract and retain slot machine players. Specifically, many people view all or a portion of slot machine play primarily as a passive, relatively boring experience.

One technique that may attract new slot machine players, increase player satisfaction and encourage continued game play at a slot machine is described in U.S. Pat. No. 6,139,431 (hereinafter "the '431 patent"). The '431 patent is hereby incorporated by reference herein in its entirety.

The '431 patent discloses, in pertinent part, a gaming machine that provides free long distance telephone calls in exchange for continued game play at the gaming machine. In one or more embodiments of the '431 patent, a slot machine player may make free long distance calls if the player initiates a minimum number of game plays during a predetermined time period. Such a reward may provide a significant incentive for a slot machine player to continue game play at a slot machine, and also may offer an economical means for casinos to attract new slot machine players.

While the '431 patent provides significant advantages over prior art gaming machines, it would be particularly beneficial if existing gaming machines could be easily retrofitted to provide similar functionality.

SUMMARY OF THE INVENTION

In a first aspect of the invention, a first apparatus is provided that includes (1) a gaming machine interface unit adapted to interface with a non-communications-enabled gaming machine and to collect information regarding game play at the non-communications-enabled gaming machine; and (2) a communications device interface unit adapted to interface with a communications device that is adapted to provide communications services (e.g., long distance telephone calls, e-mails, video conferencing or the like, such as between a player of the non-communications-enabled gaming machine and a third party).

The first apparatus further includes a controller coupled to the gaming machine interface unit and the communications device interface unit and adapted to employ the gaming machine interface unit to receive information regarding game play at the non-communications-enabled gaming machine. The controller is further adapted to (1) determine if a player is operating the non-communications-enabled gaming machine based on the received information; and (2) if the player is operating the non-communications-enabled gaming machine, employ the communications device interface unit to provide communications services based on the game play.

In a second aspect of the invention, a second apparatus is provided that includes (1) a gaming machine interface unit adapted to interface with a non-communications-enabled gaming machine and to collect information regarding a level of game play at the non-communications-enabled gaming machine; and (2) a communications device interface unit adapted to interface with a communications device that is adapted to provide communications services.

The second apparatus further includes a controller coupled to the gaming machine interface unit and the communications device interface unit. The controller is adapted to (1) employ the gaming machine interface unit to receive information regarding the level of game play at the non-communications-enabled gaming machine; and (2) if the level of game play at the non-communications-enabled gaming machine is equal to or exceeds a predetermined level of game play, employ the communications device interface unit to provide communications services.

In a third aspect of the invention, a method is provided that includes the steps of (1) providing an auxiliary unit adapted to allow a gaming machine to be retrofitted to provide communications services; and (2) retrofitting a non-communications-enabled gaming machine with the auxiliary unit so that the non-communications enabled gaming machine is adapted to provide communications services based on game play at the non-communications-enabled gaming machine.

Numerous other aspects of the invention are provided, as are systems, apparatus, methods, computer program products and/or data structures in accordance with these and other aspects of the invention. Each computer program product described herein may be carried by a medium readable by a computer (e.g., a carrier wave signal, a floppy disc, a hard drive, a random access memory, etc.).

In another aspect of the invention, a third apparatus is provided that includes means for detecting game play at a non-communications-enabled gaming machine, and means for determining if the game play qualifies for free communications services. The third apparatus also includes means for providing free communications services at the non-communications-enabled gaming machine if the game play qualifies for free communications services.

With these and other advantages and features of the invention that will become hereinafter apparent, the nature of the invention may be more clearly understood by reference to the following detailed description of the invention, to the appended claims and to the several drawings attached herein.

DETAILED DESCRIPTION

In one or more embodiments of the invention, methods and apparatus are provided that allow existing gaming machines that do not provide communications services to be easily retrofitted to provide such functionality. More specifically, the present invention allow a gaming machine that is not adapted to provide communications services based on game play at the gaming machine (a "non-communications-enabled gaming machine" as used herein) to be retrofitted or otherwise configured to provide communications services based on game play at the gaming machine. The provision of communications services such as free long distance telephone calls, e-mails, video conferencing or the like based on game play at a gaming machine may represent a significant incentive for a gaming machine player to continue game play at a gaming machine, and also may offer an economical means for casinos to attract new gaming machine players. The ability to retrofit existing gaming machines to provide communications services is particularly advantageous.

These and other aspects of the invention are described further below with reference to FIGS. 1-6.

Figure 1:
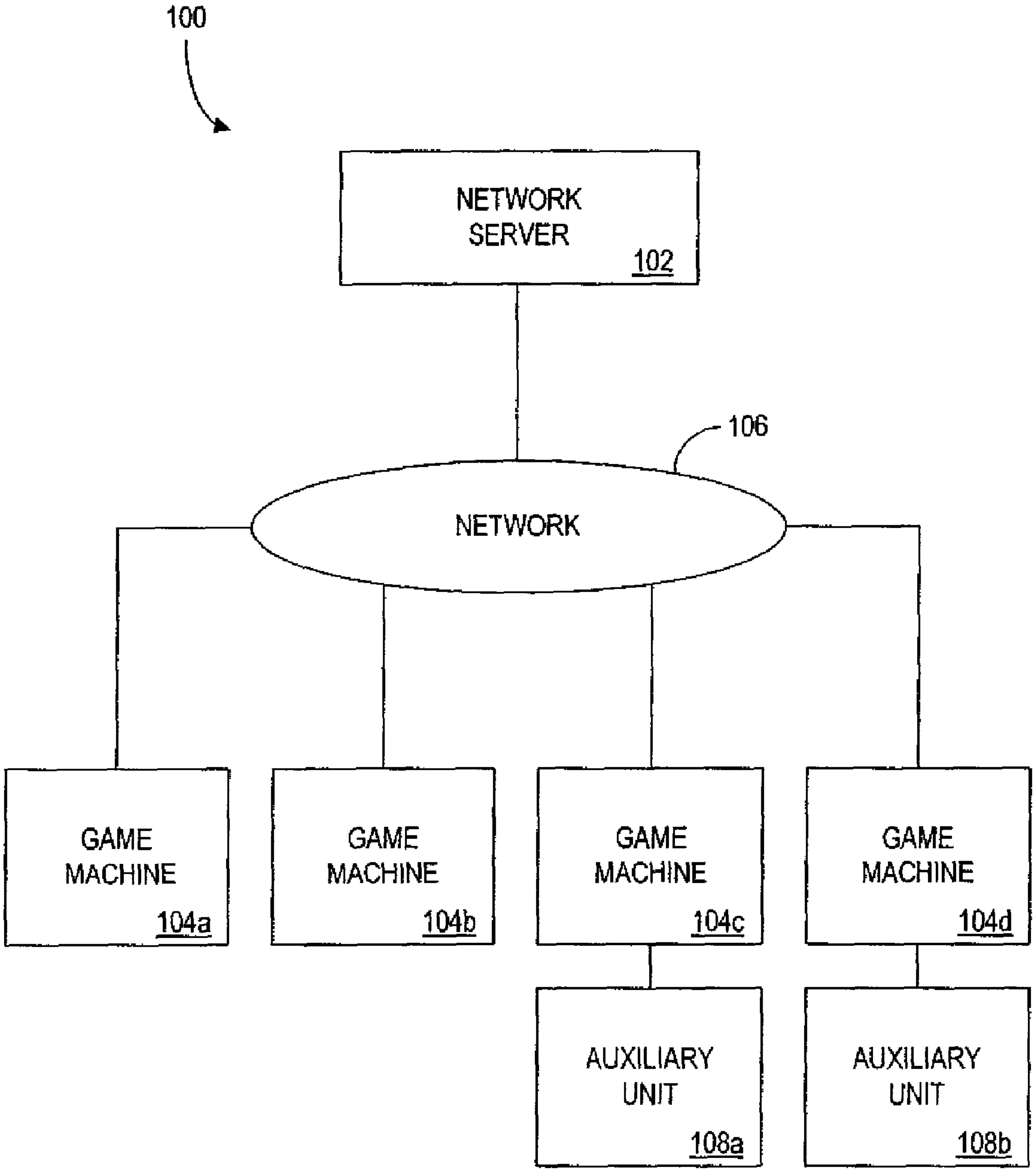
FIG. 1 is a schematic diagram of an exemplary system for providing communications services at a gaming machine in accordance with the present invention.

Exemplary Embodiments of System for Providing Communications Services at a Gaming Machine FIG. 1 is a schematic diagram of an exemplary system 100 for providing communications services based on game play at a gaming machine in accordance with the present invention. The system 100 includes a network server 102 in communication with a plurality of gaming machines 104*a*-*d* via a network 106. Although four gaming machines 104*a*-*d* are shown in FIG. 1, it will be understood that fewer or more than four gaming machines may be in communication with the network server 102. Further, the network server 102 may comprise one or more servers. The network server 102 may comprise any suitable server adapted to coordinate various processes relating to game play at the gaming machines 104*a*-*d*. Such processes may include, for example, the updating of payout or probability tables at one or more of the gaming machines, maintenance of player balances, etc. The use of network servers to coordinate gaming processes at one or more gaming machines is known in the art and is not described further herein.

The gaming machines 104*a*-*d* may include slot machines, video poker machines, pachinko machines, a combination thereof etc. Other suitable gaming machines also may be employed. In one or more embodiments of the invention, the gaming machines 104*a*-*d* are non-communications-enabled gaming machines. That is, each gaming machine 104*a*-*d* is not configured to provide communications services based on game play at the gaming machine unless retrofitted with an auxiliary unit configured in accordance with the present invention (as described further below). Exemplary embodiments of the gaming machines 104*a*-*d* are described below with reference to FIG. 2.

The gaming machines 104*a*-*d* may be in communication with the network server 102 via any conventional communications medium and/or protocol, as represented generally by the network 106. For example, the gaming machines 104*a*-*d* may communicate with the network server 102 via a WEB-based connection, a local area network (LAN), a wide area network (WAN), the Internet, other forms of internet protocol (IP) networks (e.g., intranets or extranets), a publicly switched telephone network (PSTN), a wireless communications network or any other known communications system/medium. Those skilled in the art will understand that devices in communication with each other need only be "capable of" communicating with each other and need not be continually transmitting data to or receiving data from each other. On the contrary, such devices need only transmit data to or receive data from each other as necessary, and may actually refrain from exchanging data most of the time. For example, a device in communication with another device via the Internet may not transmit data to the other device or receive data from the other device for weeks at a time. Further, devices may be in communication even though steps may be required to establish a communication link (e.g., dialing a network service provider).

With reference to FIG. 1, the system 100 also include a plurality of auxiliary units 108*a*-*b* coupled to the third and fourth gaming machines 104*c*-*d*, respectively. As will be described further below, the auxiliary units 108*a*-*d* may provide communications services based on game play at the gaming machines 104*c*-*d*. Exemplary embodiments of the auxiliary units 108*a*-*b* are described below with reference to FIG. 3-5B.

The auxiliary units 108*a*-*b* may be in communication with the gaming machines 104*c*-*d*, respectively, via any conventional communications medium and/or protocol (as described above with regard to the gaming machines 104*a*-*d* and the network server 102). More or fewer than two auxiliary units may be employed within the system 100, as may more than one auxiliary unit per gaming machine.

Exemplary Embodiments of the Gaming Machines

Figure 2:
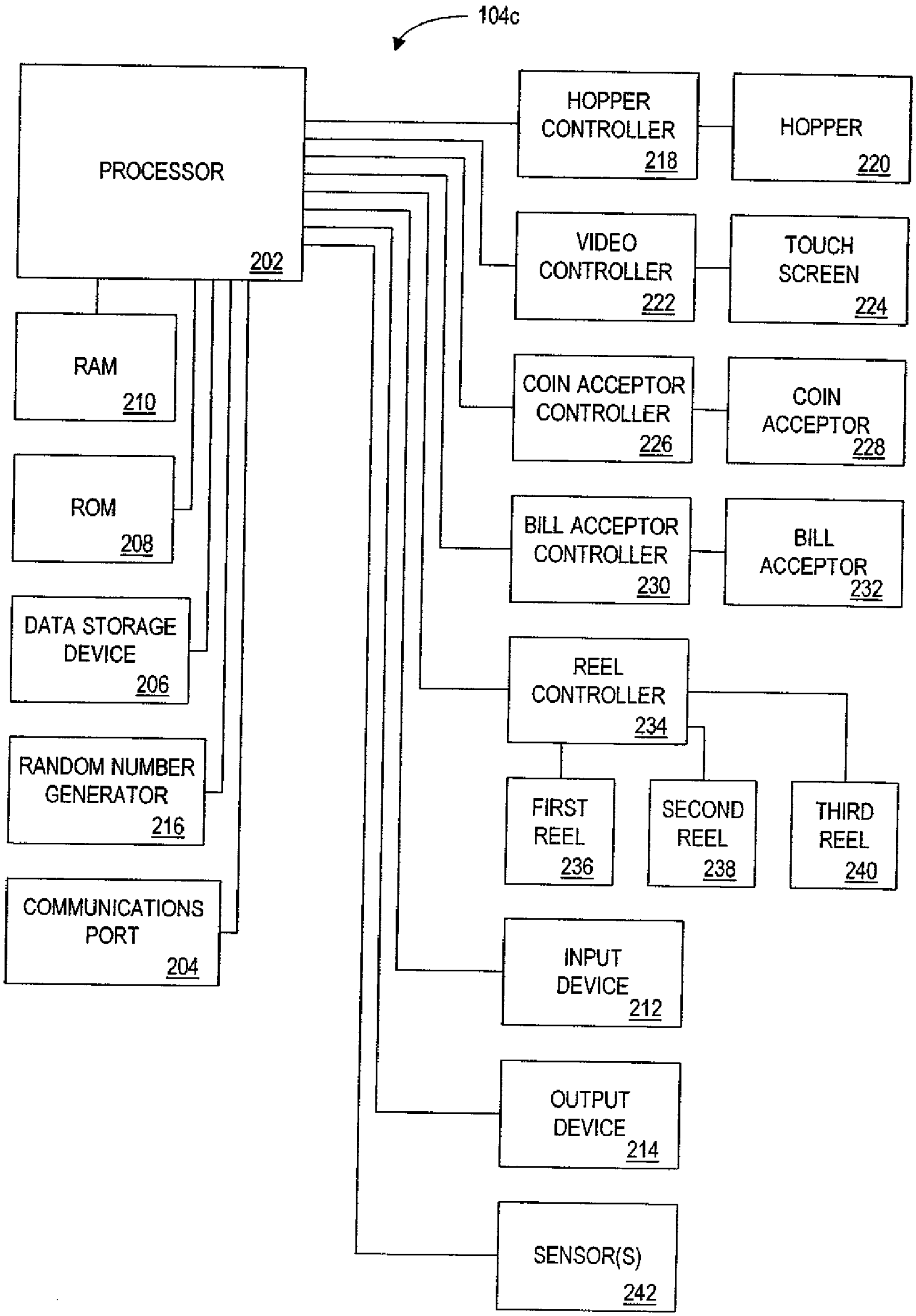
FIG. 2 is a schematic diagram of an exemplary embodiment of one of the gaming machines of the system of FIG. 1.

FIG. 2 is a schematic diagram of an exemplary embodiment of the gaming machine 104*c* of FIG. 1. The gaming machines 104*a*-*b* and 104*d* may be similarly configured. As stated, each gaming machine 104*a*-*d* may comprise a slot machine, a video poker machine, a panchinko machine or a similar device, one or more of which being modified and/or retrofitted in accordance with the present invention.

With reference to FIG. 2, the gaming machine 104*c* comprises a processor 202, such as one or more conventional microprocessors (e.g., one or more Intel® Pentium® processors). The processor 202 is in communication with a communications port 204 through which the processor 202 communicates with other devices (e.g., with the network server 102, with the auxiliary unit 108*a* or with other devices not shown). The communications port 204 may include multiple communication channels for simultaneous communication with multiple devices. Alternatively, multiple communications ports may be employed. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor 202 also is in communication with a data storage device 206. The data storage device 206 may comprise an appropriate combination of magnetic, optical and/or semiconductor memory, and may include, for example, Random Access Memory (RAM), Read-Only Memory (ROM), a compact disc and/or a hard disk. The processor 202 and the data storage device 206 each may be, for example, located entirely within a single computer or other computing device; or connected to each other by a communication medium, such as a serial port cable, a telephone line or a radio frequency transceiver. Alternatively, the gaming machine 104c may comprise one or more computers that are connected to a remote server computer (not shown) for maintaining databases.

The data storage device 206 may store, for example, a program (not shown) adapted to direct the processor 202 in accordance with conventional gaming practices (e.g., to process wagers from players, to initiate generation of a random number, to determine a game result and/or outcome value associated with a random number, to determine a payout for the game result, to pay or arrangement for payment of a player, etc.). The data storage device 206 also may store one or more databases as required to provide the above-mentioned functionality.

The data storage device 206 may include program elements such as an operating system, a database management system and "device drivers" that allow the processor 202 to interface with computer peripheral devices (e.g., a video display, a keyboard, a computer mouse, etc.).

Note that instructions of programs employed by the processor 202 may be read into a main memory (not shown) of the processor 202 from a computer-readable medium other than the data storage device 206, such as from a ROM 208 or from a RAM 210. While execution of sequences of instructions in a program causes the processor 202 to perform the gaming process steps described herein, hard-wired circuitry may be used in place of, or in combination with, software instructions for implementation of such gaming processes.

The processor 202 also may be in communication with a clock (not shown) that supplies time and date information to the processor 202 and that may comprise, for example, a clock internal to the processor 202, a clock external to the processor 202 or a clock embodied within the program 208 (e.g., based on a system clock not shown).

The gaming machine 104c may include one or more input devices 212 such as a button, a handle, a microphone, a touch screen, a keyboard or keypad, voice recognition software/hardware, etc., for use during game play at the gaming machine 104c. The gaming machine 104c similarly may include one or more output devices 214 for outputting appropriate information to a gaming machine player during game play at the gaming machine 104c. For example, the gaming machine 104c may comprise one or more speakers, a cathode ray tube or flat panel display, a projector, a physical or electronic representation of slot machine reels or a poker hand, a credit balance display, a bell that rings when a player wins, a Braille computer monitor, a printer to provide a receipt for a player's gaming credits, a light emitting diode for communicating with another device, etc.

In one or more embodiments of the invention, the gaming machine 104c also may include a random or pseudo-random number generator 216 that may be utilized by the gaming machine 104c for determining a game result (e.g., after game play has been initiated at the gaming machine 104c). The random number generator 216 also may be employed to determine a corresponding outcome value/payout to be provided to a player of the gaming machine 104c as described further below. The random number generator 216 may be embodied in hardware, software or a combination thereof as is known in the art, and may include one or more features that prevent or identify tampering.

To assist in payouts as a result of winning game results at the gaming machine 104c, the gaming machine 104c may include a hopper controller 218 and a hopper 220. The hopper controller 218 may be configured to instruct the hopper 220 when to dispense payment, and how much payment to dispense, to a player as a result of a winning game result at the gaming machine 104c. Hopper and hopper controllers are well known in the casino gaming machine arts and will not be described in further detail herein.

In addition to the hopper controller 218, the gaming machine 104c may include a plurality of other controllers for controlling output display, payment receipt, reel position/spinning and the like during game play. For example, as shown in FIG. 2, the gaming machine 104c may include a video controller 222 for controlling operation of a touch screen 224 or other video display that may be employing during game play at the gaming machine 104c. (Note that the video controller 222 and/or the touch screen 224 may form part of the output devices 214).

Further shown in FIG. 2 are a coin acceptor controller 226 and a coin acceptor 228 for controlling coin-based payment by a gaming machine player, a bill acceptor controller 230 and a bill acceptor 232 for controlling bill-based payment by a gaming machine player, and a reel controller 234 for controlling position and/or spinning of a first reel 236, a second reel 238 and a third reel 240 of the gaming machine 104c. It will be understood that one or more of the controllers 218, 222, 226, 230 or 234 may be eliminated depending on the type of gaming performed by the gaming machine 104c (e.g., a video poker machine typically will not employ a reel controller and reels, and other numbers of reels may be employed). One or more of the controllers 218, 222, 226, 230 or 234 may be in communication with the processor 202 (as shown), and one or more of the controllers 218, 222, 226, 230 or 234 may be combined into a single controller.

In addition to the controllers 218, 222, 226, 230 or 234, the gaming machine 104c may include one or more additional controllers and associated hardware such as a player tracking card controller and a player tracking card reader for tracking the identity, credit line, balance, etc., of a gaming machine player, a sound controller for controlling audio signals output by the gaming machine 104c or the like. The gaming machine 104c further may be configured with one or more of a bar code reader (e.g., for discerning value from "cashless" gaming vouchers), a biometric device for determining an identity or age of a player, a credit, stored value, smart or debit card authorization terminal (e.g., for cashless gaming), a network controller, etc.

As further shown in FIG. 2, the gaming machine 104c has been retrofitted and/or otherwise configured so that one or more sensors 242 are in communication with the processor 202 for use in detecting game play at the gaming machine 104c and/or for communicating game play information to the auxiliary unit 108a as described further below. The one or more sensors 242 may be coupled to the processor 202 directly (as shown), via the communications port 204 or via any other suitable medium or protocol. In at least one embodiment of the invention, the one or more sensors 242 may form part of an auxiliary unit 108a-b and/or may be eliminated.

The connections between the components 202-242 associated with the gaming machine 104c may be wired, optical, wireless, a combination thereof or any other type of connection. As stated, the gaming machines 104a-b and 104d may be configured similarly to the gaming machine 104c of FIG. 2.

Exemplary Embodiments of the Auxiliary Units

Figure 3:
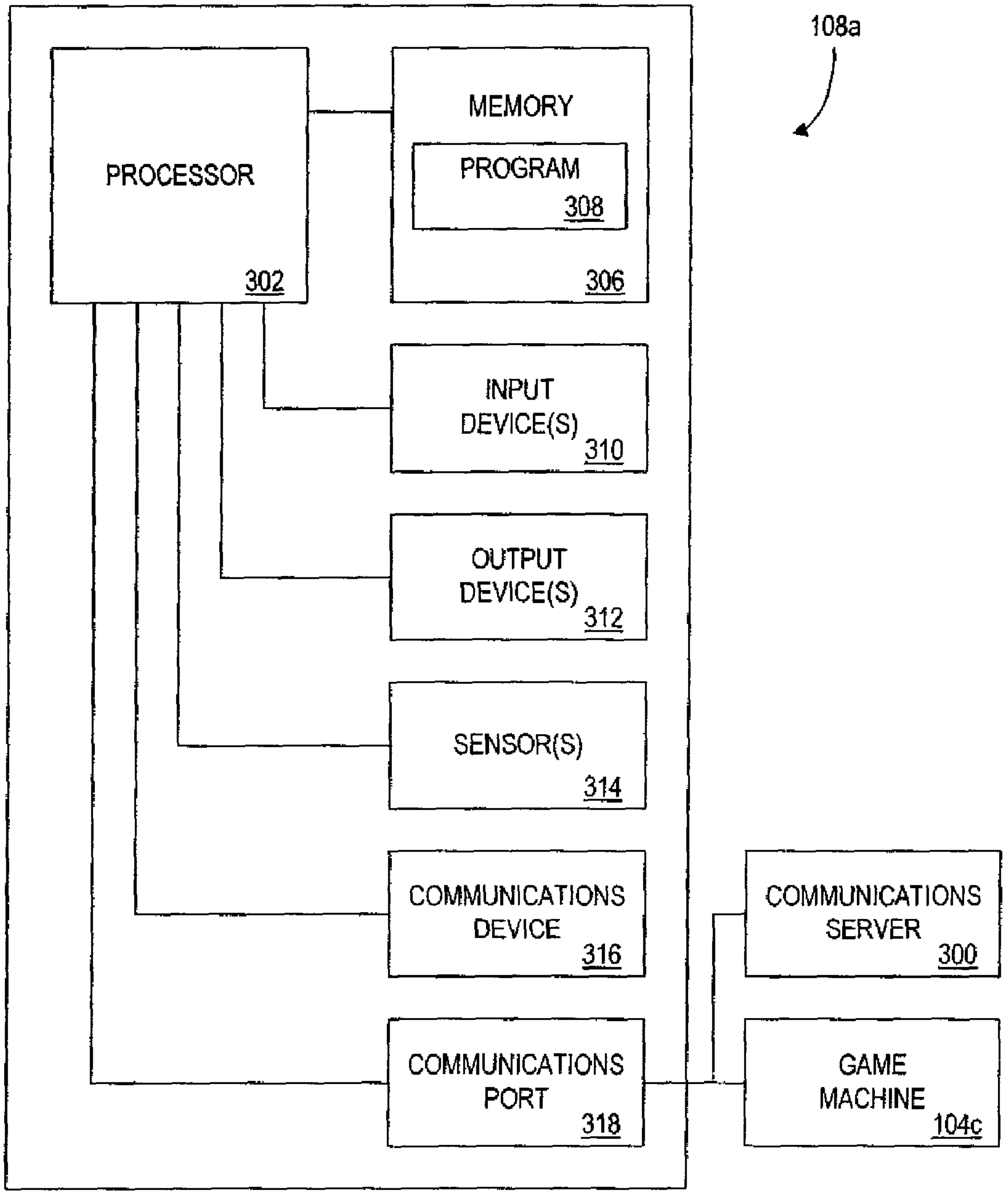
FIG. 3 is a schematic diagram of an exemplary embodiment of one of the auxiliary units of the system of FIG. 1.

FIG. 3 is a schematic diagram of an exemplary embodiment of the auxiliary unit 108a of the system 100 of FIG. 1

(shown coupled to the gaming machine 104*c* and a communications server 300). The auxiliary unit 108*b* may be similarly configured.

With reference to FIG. 3, the auxiliary unit 108*a* comprises a processor 302, such as one or more conventional microprocessors (e.g., one or more Intel® Pentium® processors). The processor 302 is in communication with a communications port 304 through which the processor 302 may communicate with other devices (e.g., with the gaming machine 104*c*, the communications server 300 or with other devices not shown). The communications port 304 may include multiple communication channels for simultaneous communication with multiple devices. Alternatively, multiple communications ports may be employed. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor 302 also is in communication with a data storage device 306. The data storage device 306 may comprise an appropriate combination of magnetic, optical and/or semiconductor memory, and may include, for example, Random Access Memory (RAM), Read-Only Memory (ROM), a compact disc and/or a hard disk. The processor 302 and the data storage device 306 each may be, for example, located entirely within a single computer or other computing device; or connected to each other by a communication medium, such as a serial port cable, a telephone line or a radio frequency transceiver. Alternatively, the auxiliary unit 108*a* may comprise one or more computers that are connected to a remote server computer (not shown).

The data storage device 306 may store, for example, a program 308 (e.g., computer program code and/or a computer program product) adapted to direct the processor 302 in accordance with the present invention, and particularly in accordance with the processes described in detail hereinafter with regard to the auxiliary unit 108*a*. The data storage device 306 also may store data (e.g., in one or more databases not shown) as required to implement any of the processes described herein with regard to the auxiliary unit 108*a*. Such data may include predetermined levels of game play required for the provision of communications services such as a predetermined number of handle pulls or other game initiation events, a predetermined time period of game play, a predetermined rate of game play, a predetermined bet or average bet, etc.

The program 308 may be stored, for example, in a compressed, an uncompiled and/or an encrypted format, and may include computer program code that allows the auxiliary unit 108*a* to employ the communications port 304 or another communication path to:

1. receive information regarding game play at a non-communications-enabled gaming machine (e.g., the gaming machines 104*c*);
2. determine if a player is operating the non-communications-enabled gaming machine based on the received information; and
3. if the player is operating the non-communications-enabled gaming machine, provide communications services based on the game play.

Suitable computer program code may be provided for performing numerous other functions such as receiving a signal from the non-communications-enabled gaming machine indicative of game play at the non-communications enabled gaming machine, employing a sensor to collect information regarding game play at the non-communications-enabled gaming machine, detecting a presence of a player at the non-communications-enabled gaming machine, etc. The computer program code required to implement the above functions (and the other functions described herein) can be developed by a person of ordinary skill in the art, and is not described in detail herein.

The data storage device 306 may include program elements such as an operating system, a database management system and "device drivers" that allow the processor 302 to interface with computer peripheral devices (e.g., a video display, a keyboard, a computer mouse, etc.).

Note that instructions of programs employed by the processor 302 may be read into a main memory (not shown) of the processor 302 from a computer-readable medium other than the data storage device 306, such as from a ROM or from a RAM. While execution of sequences of instructions in the program 308 causes the processor 302 to perform the process steps described herein, hard-wired circuitry may be used in place of, or in combination with, software instructions for implementation of the processes of the present invention. Thus, embodiments of the present invention are not limited to any specific combination of hardware and software.

The processor 302 also may be in communication with a clock (not shown) that supplies time and date information to the processor 302 and that may comprise, for example, a clock internal to the processor 302, a clock external to the processor 302 or a clock embodied within the program 308 (e.g., based on a system clock not shown).

The auxiliary unit 108*a* may include one or more input devices 310 such as one or more buttons, a microphone, a touch screen, a keyboard or keypad, voice recognition software/hardware, etc., for verifying or otherwise determining game play or a level of game play at the gaming machine 104*c*, for establishing or otherwise facilitating communications based on game play and/or a level of game play at the gaming machine 104*c*, etc. The auxiliary unit 108*a* similarly may include one or more output devices 214 for outputting appropriate information to a gaming machine player (e.g., voice, data and/or the like during communications services, such as a telephone call, video conference, etc., between a gaming machine player and a third party). For example, the gaming machine 104*c* may comprise one or more speakers, a cathode ray tube or flat panel display, a projector, etc. In one or more embodiments of the invention, at least a portion of the input or output devices or other controllers/devices of a gaming machine may be included in and/or replaced by similar components of an auxiliary unit 108*a-b* as described further below.

As further shown in FIG. 3, the auxiliary unit 108*a* may include one or more sensors 314 for use in obtaining information regarding game play at the gaming machine 104*c* and/or for communicating game play information to the processor 302. While the sensors 314 are shown as being directly connected to the processor 302 in FIG. 3, in other embodiments one or more of the sensors 314 and/or other sensors (such as the sensors 242 shown coupled to the processor 202 of the gaming machine 104*c* of FIG. 2) may be coupled to the processor 302 via the communications port 304.

When employed, the sensors 314 (FIG. 3) and/or the sensor 242 (FIG. 2) may include any sensors suitable for determining information regarding game play at the gaming machine 104*c*. Information regarding game play that may be determined includes, for example, whether a player is present at the gaming machine 104*c* (e.g., whether the player is seated in front of the gaming machine 104*c*), whether a player has placed a coin-based or bill-based wager, whether a player has initiated game play at the gaming machine 104*c* (e.g., via a button, handle, lever, keypad, etc.), whether one or more reels of the gaming machine 104*c* are spinning, an amount of or a change in a credit balance of a player of the gaming machine 104*c*, whether a player of the gaming machine 104*c* receives a payout and/or an amount of any payout and/or whether all or an portion of any payout has been added to an existing balance or cashed out, a duration for or time period during which any of the above occurred, etc. Other game play information that may be determined includes, for example, an average amount bet by a player (e.g., an average amount over a given time period), a per unit time value (e.g., a rate of play such as a rate of game initiations), a total amount bet (e.g., over a given time period), whether any of the above listed information alone or in combination is within a predetermined range, above or below a predetermined threshold, produces a predetermined result when combined (e.g., via a Boolean or other technique), etc. Note that sensors 314 and/or 242 may provide such information directly, or the processor 302 may determine such information based one or more signals from the sensors 314 and/or 242. For example, as will be described further below, a sensor may provide a detection signal to the processor 302 each time game play is initiated at the gaming machine 104*c*, and the processor 302 may determine a rate of play based on a plurality of the detection signals.

As stated, the sensors 314 and/or the sensors 242 may include any suitable sensor for determining information regarding game play at the gaming machine 104*c*. In one embodiment of the invention, a sensor 314 or 242 may determine if a bet or wager has been provided to the gaming machine 104*c*. For example, a sensor 314 or 242 may include a video camera mounted so as to view a reel of the gaming machine 104*c*, detect whether and/or when the reel is spinning, and provide an appropriate indication of the same to the processor 302 of the auxiliary unit 108*a*. Likewise, a video camera may be mounted so as to view a credit balance indicator of the gaming machine 104*c*, and provide an indication of the credit balance (or a change in the credit balance) to the processor 302. A video camera also may be employed to detect payment of a wager by a player of the gaming machine 104*c* by monitoring insertion of coins into the coin acceptor 222 or bills into the bill acceptor 232 of the gaming machine 104*c*.

As another example, a sensor 314 or 242 may include a tilt sensor or video camera employed to detect each time game play is initiated at the gaming machine 104*c* (e.g., by monitoring a position or change in position of a handle or button that initiates game play). In such an embodiment, a player may be precluded from actuating the handle or button until a bet has been placed (e.g., to prevent a false indication of the occurrence of game initiation). For example, a player of the gaming machine 104*c* may not be able to initiate game play at the gaming machine 104*c* until a special sound or some other indicator is output to the player.

In another embodiment of the invention, a sensor 314 or 242 may include a weight detector, such as a scale, adapted to monitor a weight or change in weight of the gaming machine 104*c*. Such weight information may be employed to determine if a bet (e.g., one or more coins) has been placed at the gaming machine 104*c*, and/or an amount of such a bet.

A sensor 314 or 242 also may monitor a payout at the gaming machine 104*c*. For example, a video camera may monitor a final reel position of the gaming machine 104*c* following game play, and provide such information to the processor 302 of the auxiliary unit 108*a*. In response thereto, the processor 302 may determine a game result and accompanying outcome value/payout of game play (e.g., employing one or more payout tables and/or outcome databases (not shown) stored within the memory 306) for use in determining whether to provide communications services (as described below). A video camera similarly may be employed to monitor a credit balance indicator of the gaming machine 104*c* to determine a payout at the gaming machine 104*c*. A payout at the gaming machine 104*c* also may be determined by employing a sensor within a coin tray or other payout location of the gaming machine 104*c*. For example, a weight sensor, a magnetic sensor, a conductivity sensor, a reflective or through-beam light-based sensor, a pressure sensor, an audio sensor, etc., may be employed to detect a coin or similar payout at the gaming machine 104*c* (e.g., by detecting a change in one or more of weight, magnetic properties, conductivity, reflectivity, etc., due to a payout, through actuation of a switch due the weight/pressure of the payout, by detecting a sound characteristic of coins dropping into a coin tray, etc.).

In general, the sensors 314 and/or 242 may be mounted on, to or within the gaming machine 104*c*, on, to or within the auxiliary unit 108*c*, or at any other location (e.g., on a chair positioned in front of the gaming machine 104*c*, above the gaming machine 104*c* such as on an arm or support, as part of a standalone unit, etc.). In at least one embodiment of the invention, a security camera of a casino may be employed to monitor/detect game play at a gaming machine in accordance with any of the above described techniques (e.g., by employing a portion of a security video camera screen that corresponds to a slot machine reel, a credit balance indicator of a gaming machine, etc.). The use of one or more of the above sensors to detect game play is particularly advantageous in that a gaming machine may be easily retrofitted therewith to provide game play information to the auxiliary unit 108*a*.

In addition to, or in place of the sensors 314 or 242, the auxiliary unit 108*a* may monitor one or more signals generated by the gaming machine 104*c* to determine information regarding game play at the gaming machine 104*c*. For example, the auxiliary unit 108*a* (e.g., via the communications port 304 and/or the processor 302) may monitor:

1. a communication between a sensor and a controller of the gaming machine 104*c* (e.g., the coin acceptor 228 and the coin acceptor controller 226, etc.);
2. a communication between an input device and a controller of the gaming machine 104*c* (e.g., a communication between the touch screen 224 and the video controller 222, etc.);
3. a communication between an output device and a controller of the gaming machine 104*c* (e.g., a communication between the touch screen 224 and the video controller 222, etc.);
4. a communication between a processor and a controller of the gaming machine 104*c* (e.g., a communication between the processor 202 and any of the controllers 218, 222, 226, 230, 234, etc.);
5. a communication between a processor and an input device of the gaming machine 104*c* (e.g., a communication between the processor 202 and the input devices 212); and/or
6. a communication between a processor and an output device of the gaming machine 104*c* (e.g., a communication between the processor 202 and the output devices 214).

Figure 4:
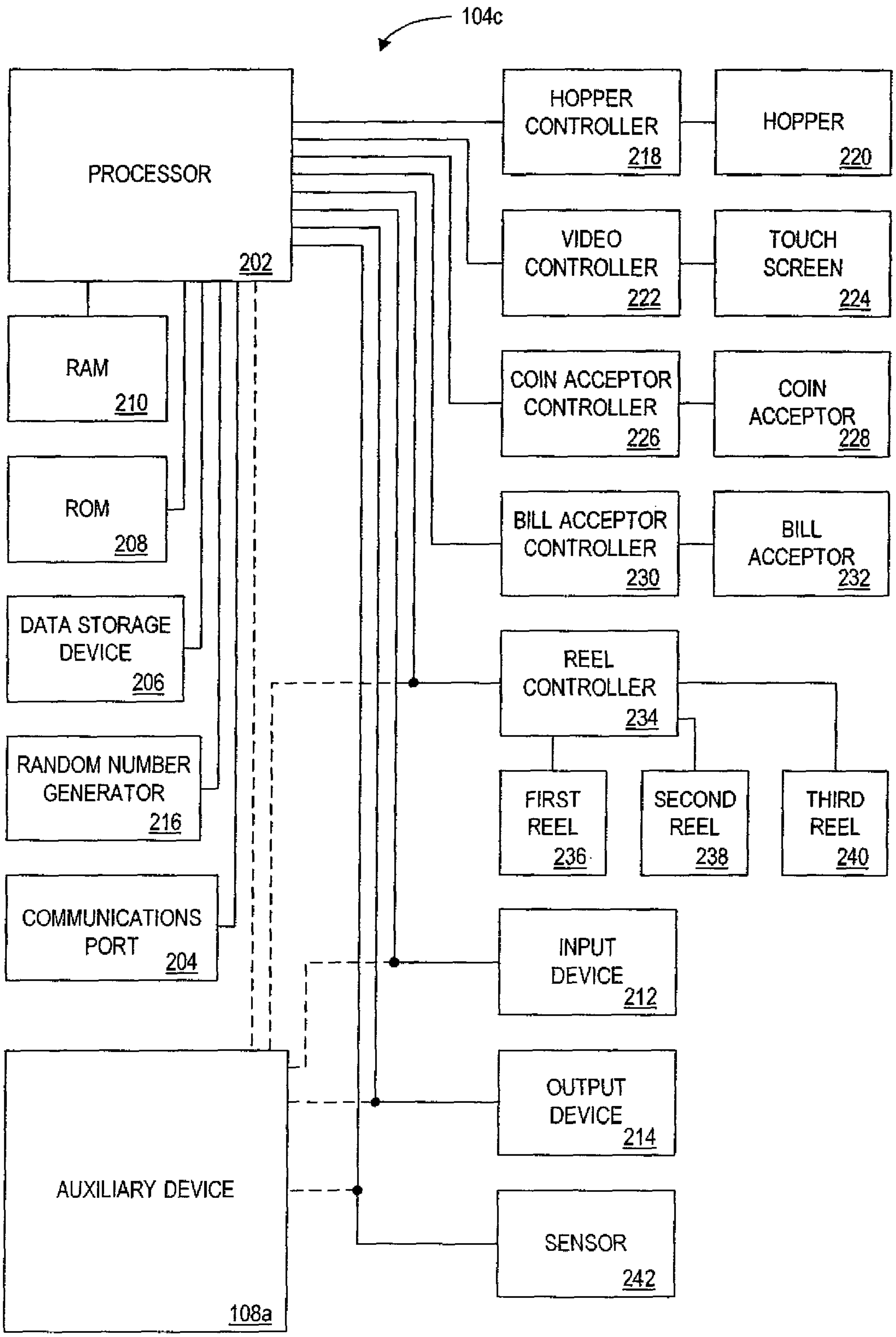
FIG. 4 illustrates an exemplary embodiment of the invention in which an auxiliary unit of FIG. 1 is shown monitoring communications paths of a gaming machine.

For example, FIG. 4 illustrates an exemplary embodiment of the invention in which the auxiliary unit 108*a* is shown monitoring communications directly from the processor 202, and between the reel controller 234 and the processor 202, the input devices 212 and the processor 202, the output devices 214 and the processor 202 and the sensors 242 and the processor 202.

The signals/communications described above with reference to (1)-(6) may include, for instance, an indication of an outcome of game play, an indication of reel position, an indication of payment or a payment amount, an indication of a credit balance, an indication of an audio or video signal, and indication of a game initiation signal such as the pushing of a button or the pulling of a handle, etc. In one or more embodiments, these and other signals/communications may be obtained by and fed to the auxiliary unit 108*a* by inserting a splitter into a communications path (e.g., with an amplifier/repeater if required), splicing or soldering a wire to the communications path (e.g., and running one end of the wire to the auxiliary unit 108*a*), removing a wire from a communications path and coupling the wire to the auxiliary unit 108*a* (which may, in turn, retransmit any signals traveling across the wire back to the gaming machine 104*c*), etc. Such signals/communications also may be monitored, determined and/or obtained from the processor 202 (e.g., via the communications port 204 of the gaming machine 104*c*).

Figure 5A:
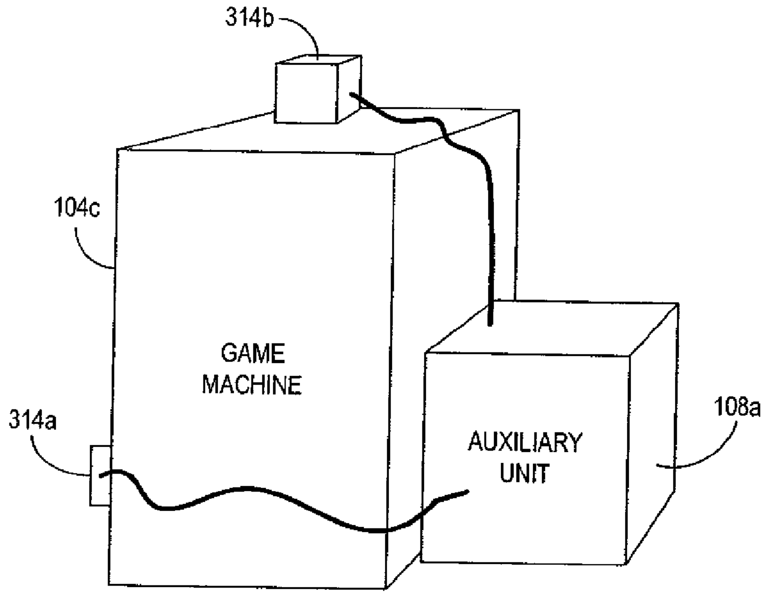
FIGS. 5A and 5B illustrate a side perspective view and a front perspective view, respectively, of a gaming machine in communication with an auxiliary unit.
Figure 5B:
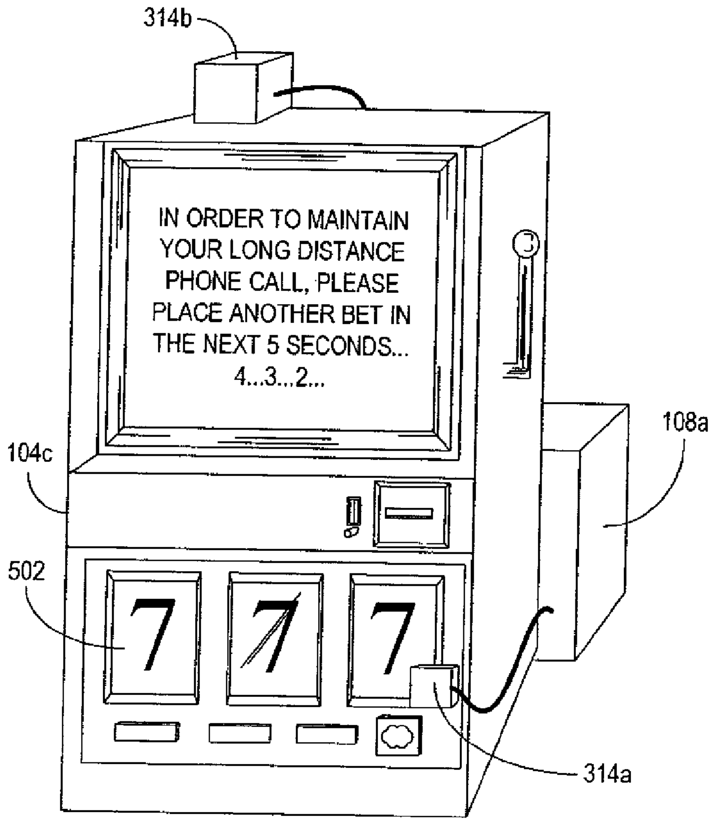

FIGS. 5A and 5B illustrate a side perspective view and a front perspective view, respectively, of the gaming machine 104*c* in communication with the auxiliary unit 108*a*. The auxiliary unit 108*a* may or may not be physically connected to the gaming machine 104*c*. For example, in the embodiment of FIGS. 5A and 5B, a case or housing of the auxiliary unit 108*a* is shown attached to a case or housing of the gaming machine 104*c*. FIGS. 5A and 5B further illustrate a first sensor 314*a* coupled to the gaming machine 104*c* (e.g., for detecting a position and/or spinning of a reel 502 of the gaming machine 104*c* and for providing such information to the auxiliary unit 108*a*), and a second sensor 314*b* coupled to the gaming machine 104*c* (e.g., for detecting a presence of a game player at the gaming machine 104*c* and for providing such information to the auxiliary unit 108*a* or for use during the provision of communication services).

Referring again to FIG. 3, the auxiliary unit 108*a* also includes a communications device 316 adapted to facilitate and/or provide communications services to a gaming machine player of the gaming machine 104*c* as described further below, alone or in cooperation with the communications server 300.

The communications device 316 may be located within or outside of the auxiliary unit 108*a*, and may or may not form part of the auxiliary unit 108*a*. In at least one embodiment of the invention, the communications device 316 may comprise, for example, a standard communications device such as a telephone or telephone receiver/headset combination that may send and receive audio signals in the form of a local, regional or long distance telephone call via the processor 302, the communications port 304 and the communications server 300 when enabled by the auxiliary unit 108*a* (as described below). In another embodiment of the invention, the communications device 316 may include a regulator and a voice response unit (VRU). In general, when the communications device 316 is employed for telephone calls, the communications device 316 may comprise a suitable combination of a microphone, speaker and/or keypad (e.g., implemented via one or more of the input devices 310 and/or output devices 312 of the auxiliary unit 108*a*).

The communications device 316 alternatively may be employed for video-enable telephone calls (e.g., a video teleconference), sending and/or receiving e-mails, instant messaging, or to provide similar communications services at the gaming machine 104*c* (e.g., to a player of the gaming machine 104*c*). When configured to perform such functions, the communications device 316, the input devices 310 and/or the output devices 312 of the auxiliary unit 108*a* may include components necessary for such functionality (e.g., a camera, a video display, a keyboard or keypad, etc.), and/or such components may be provided external to the auxiliary unit 108*a*.

As stated the communications device 316 need not be part of the auxiliary unit 108*a*. For example, the auxiliary unit 108*a* may only interface with the communications device 316 (e.g., via a predefined physical connection such as a parallel or serial cable, a wireless connection/channel, the communications port 304, etc., using a predefined communications protocol such as a predefined sequence of data bits or values). To avoid tampering, the communications device 316 may be mounted to the auxiliary unit 108*a* and/or the gaming machine 104*c*. As stated, the auxiliary unit 108*b* of FIG. 1 may be configured similarly to the auxiliary unit 108*a*.

The communications server 300 may include, for example, a server that facilitates connection of the auxiliary unit 108*a* and/or the communications device 316 to a telephone network, such as by routing a call to an available telephone line of a casino or other operator of the gaming machine 104*c*, a high speed Internet connection of a casino or other operator of the gaming machine 104*c* or the like.

In at least one embodiment of the invention, one or more of the sensors 242 and 316, the processor 302, the communication port 304 and/or other components of an auxiliary unit 108*a-b* may be considered to form a gaming machine interface unit adapted to (1) interface with a gaming machine, such as one of the gaming machines 104*a-d*; and (2) collect information regarding game play at the gaming machine. Likewise, one or more of the processor 302, the communication port 304, the input devices 310, the output devices 316 and/or other components of an auxiliary unit 108*a-b* may be considered to form a communications device interface unit adapted to interface with a communications device such as the communications device 316 and/or the communications server 300.

Exemplary Operation of the Gaming System

Figure 6:
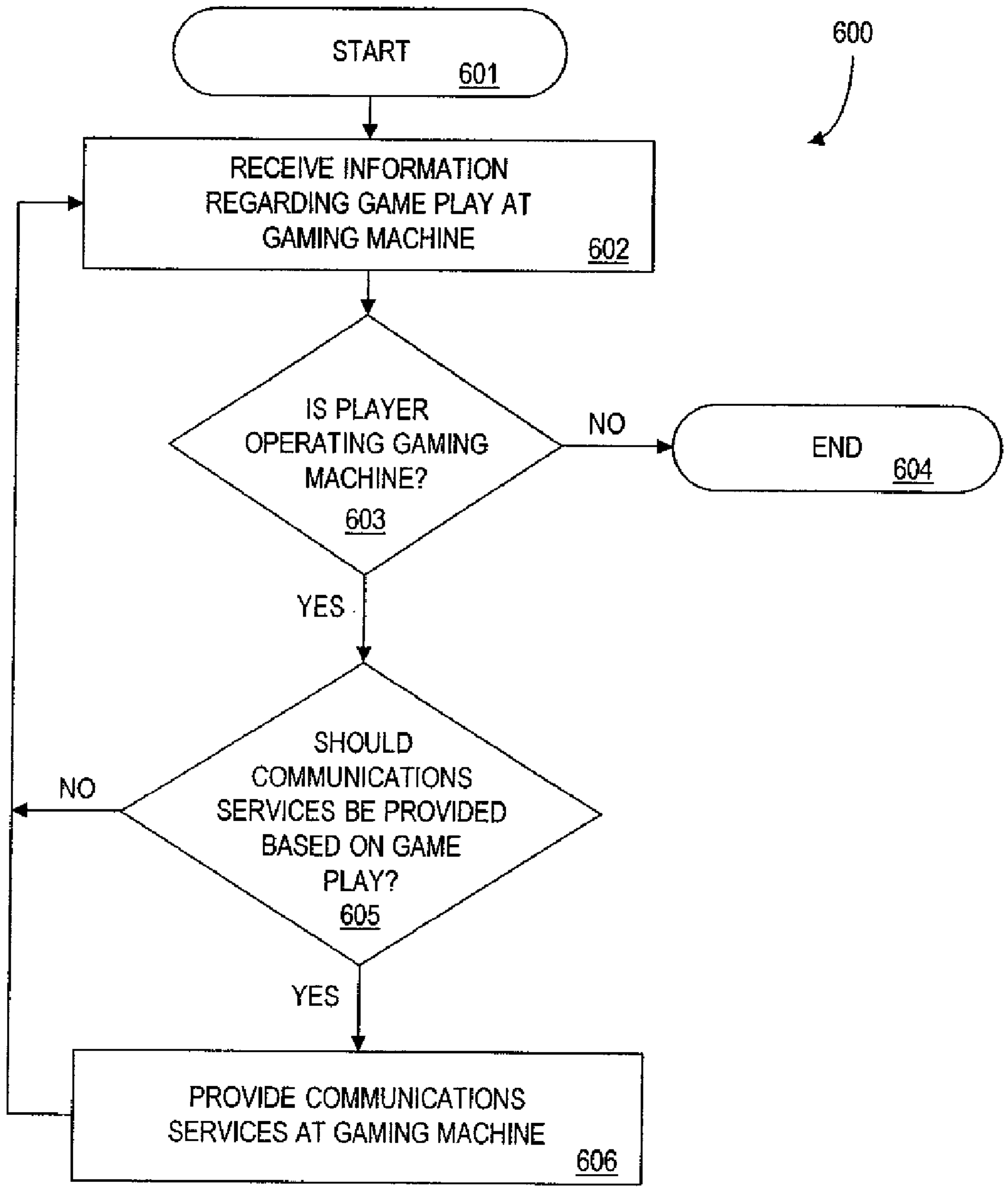
FIG. 6 illustrates a flow chart of an exemplary process of the system of FIGS. 1-5B useful in describing the general operation of the system.

FIG. 6 illustrates a flow chart of an exemplary process 600 of the system 100 of FIGS. 1-5B useful in describing the general operation of the system 100. One or more of the steps of the process 600 may be embodied within computer program code of the program 308 of one or more of the auxiliary units 108*a-b*. The above-mentioned computer program code may be embodied in one or more computer program products. For convenience, the process 600 is described with reference to the gaming machine 104*c* and the auxiliary unit 108*a*. It will be understood that a similar process may be performed with any gaming machine that has been retrofitted with an auxiliary unit provided in accordance with the present invention.

With reference to FIG. 6, the process 600 begins at step 601. At step 602, the auxiliary unit 108*a* receives information regarding game play at the gaming machine 104*c*. For example, the gaming machine 104*c* may receive information regarding game play from one or more of the sensors 242 (FIG. 2) and/or 314 (FIG. 3), in the form of a signal generated by the gaming machine 104*c* during its normal operation, etc., as previously described with reference to FIGS. 3-5B. Information regarding game play that may be received/determined may include, for example, whether a player is present at the gaming machine 104*c* (e.g., whether the player is seated in front of the gaming machine 104*c*), whether a player has placed a coin-based or bill-based wager, whether a player has initiated game play at the gaming machine 104*c* (e.g., via a button, handle, lever, keypad, etc.), whether one or more reels of the gaming machine 104*c* are spinning, an amount of or a change in a credit balance of a player of the gaming machine 104*c*, whether a player of the gaming machine 104*c* receives a payout and/or an amount of any payout and/or whether all or an portion of any payout has been added to an existing balance or cashed out, a duration for or time period during which any of the above occurred, etc. Other game play information that may be received/determined includes, for example, an average amount bet by a player (e.g., an average amount over a given time period), a per unit time value (e.g., a rate of play such as a rate of game initiations), a total amount bet (e.g., over a given time period), whether any of the above listed information alone or in combination is within a predetermined range, above or below a predetermined threshold, produces a predetermined result when combined (e.g., via a Boolean or other technique), etc.

In step 603, the auxiliary unit 108*a* determines whether a player is operating the gaming machine 104*c* based on the information received at step 602. For example, the auxiliary unit 108*a* may detect a period of inactivity, absence of a player at the gaming machine, etc. If the auxiliary unit 108*a* determines that a player is not operating the gaming machine 104*c*, then the process 600 ends at step 604; otherwise, the process 600 proceeds to step 605.

In step 605, the auxiliary unit 108*a* determines whether communications services should be provided to a player of the gaming machine 104*c* based on the game play being performed at the gaming machine 104*c*. For example, the auxiliary unit 108*a* may allow communications services at the gaming machine 104*c* (e.g., during game play) only if a condition of game play is satisfied or if the player has accumulated a balance or credit of communications services based on game play at the gaming machine 104*c* (or another gaming machine).

Exemplary conditions of game play that may be employed for determining whether a player should receive communications services at the gaming machine 104*c* may include, for example, an average amount bet by a player (e.g., an average amount over a predetermined time period), a per unit time value (e.g., a rate of play such as a rate of game initiations), a total amount bet (e.g., over a given time period), whether any of the above listed information alone or in combination is within a predetermined range, above or below a predetermined threshold, produce a predetermined result when combined (e.g., via a Boolean or other technique), or some other measure of level of game play.

In another embodiment, a player may accumulate a balance or credit (e.g., "minutes") to receive communications services. For instance, a player may receive a credit of communication time whenever the player achieves a predetermined level of game play (as described above) at a gaming machine that employs one of the auxiliary units 108*a-b*, and must accumulate a predetermined balance before communications services are provided to the player. Such communication credit may be stored, for example, on a customer card that may be read and/or written to by the auxiliary unit 108*a*.

If, based on game play at the gaming machine 104*c*, the player is not to receive communications services at the gaming machine 104*c*, the process 600 returns to step 602 to receive additional information regarding game play at the gaming machine 104*c*. In an embodiment where a balance or credit may be received, a player may be credited for game play appropriately. However, if based on game play at the gaming machine 104*c*, the player is to receive communications services at the gaming machine 104*c*, the process 600 proceeds to step 606.

In step 606, the auxiliary unit 108*a* provides communications services to the player of the gaming machine 104*c*. Communications services may include the ability to make and/or receive one or more free or reduced rate local, regional and/or long distance telephone calls, send and/or receive e-mails, participate in one or video-enable telephone calls, send/receive instant messaging or the like. Such services may be provided, for example, via the communications device 316 and/or the communications server 300. For example, in a telephone call embodiment, the player may pick-up or otherwise active the communications device 316, thereby causing the communications device to send an "off-hook" or similar signal to communications server 300. A dial tone then may be communicated to the player (e.g., via the communications device 316, the processor 302, an output device 312, etc.), and the player may dial a desired telephone number to complete a telephone call. Similar processes may be performed for other types of communications services.

In one or more embodiments of the invention, one or more characteristics of the communications services may be limited or otherwise affected by game play (and/or level of game play) at the gaming machine 104*c*. For example, the auxiliary unit 108*a* may limit one or more of the duration of a telephone call or other communications services (e.g., the length of an e-mail or video conference), the bandwidth of data communicated during the communications services (e.g., the rate of streaming video sent/received), the cost of the communications services, the content during the communications services (e.g., only certain words may be used), etc. In one embodiment of the invention, such limits on communications services are based on game play at the gaming machine 104*c* such as an average amount bet by a player (e.g., an average amount over a predetermined time period), a per unit time value (e.g., a rate of play such as a rate of game initiations), a total amount bet (e.g., over a given time period), whether any of the above listed information alone or in combination is within a predetermined range, above or below a predetermined threshold, produce a predetermined result when combined (e.g., via a Boolean or other technique), or some other measure of level of game play.

Communications services may terminate automatically, or a trigger, warning or other signal may be provided to a gaming machine player to indicate that communications services are to end (e.g., within a predetermined time). In one or more embodiments of the invention, continued game play (e.g., at a predetermined game level) may result in continued communications. Such a "reward" may provide a significant incentive for a gaming machine player to continue game play at a gaming machine, and also may offer an economical means for casinos to attract new gaming machine players. For example, following step 606, the process 600 may return to steps 602-605 to determine whether on-going communications services should continue or new communications services should be provided. FIG. 5B illustrates an exemplary warning regarding the termination of communications services that may be provided to a gaming machine player (e.g., on a display of the gaming machine 104*c* and/or the auxiliary unit 108*a*). Other warnings may be provided (e.g., audio warnings).

To commence communications services via the auxiliary unit 108*a*, the auxiliary unit 108*a* (e.g., via the processor 302 and/or the communications port 304) may selectively activate the communications device 316 (e.g., allow communications via the communications device 316 when appropriate and otherwise not allow such communications). Such activation and deactivation may be performed, for example, by sending an activation signal and a subsequent a deactivation signal to the communications device 316, or a command that indicates a time period during which the communications device 316 should be active. Upon receiving such commands, the communications device 316 may activate, deactivate, and activate for the time period, respectively. Other data protocols may be employed between the auxiliary unit 108*a* and the communications device 316.

The foregoing description discloses only exemplary embodiments of the invention. Modifications of the above disclosed apparatus and methods which fall within the scope of the invention will be readily apparent to those of ordinary skill in the art. For instance, other techniques for determining information regarding game play at a gaming machine, and for providing such information to an auxiliary unit 108*a-b*, also may be employed. For example, a separate communications link may be established between a gaming machine and an auxiliary unit 108*a-b*, such as by employing a player tracking card as a communications link. A credit balance display or a game initiation button/handle that includes a signal path to an auxiliary unit 108*a-b* may be retrofitted into a gaming machine to provide game play information to the auxiliary unit. An accelerometer or similar device may be coupled to one or more reels of a gaming machine and employed to provide (e.g., wirelessly or otherwise) game play information to an auxiliary unit 108*a-b*. In another embodiment, one or more reels of a gaming machine may be painted with a paint that is displayed only when illuminated by ultraviolet light (e.g., to facilitate accurate detection of reel position during monitoring by a video camera). Further, power fluctuations associated with game play at a gaming machine (e.g., while reels are spinning) may be monitored and used to provide game play information to an auxiliary unit 108*a-b*.

Any of the communications paths or channels described herein may comprise electrical, optical, radio wave and/or other known communications paths or channels. Any data protocol may be used for information exchange, as may digital and/or analog communications. Commands such as activation and/or deactivation commands may comprise one or more unique bits or bytes or other values.

A gaming machine (e.g., a non-communications enabled gaming machine) may be retrofitted to operate in accordance with the present invention through use of an auxiliary unit 108*a-b*. Such retrofitting may include one or more of (1) opening a case of a gaming machine, (2) altering a case of the gaming machine (e.g., to form a hole or other opening for one or more wires), (3) connecting at least one wire from the gaming machine to an auxiliary unit (e.g., to create a signal path between the auxiliary unit and the gaming machine) and (4) closing the case of the gaming machine. An auxiliary unit 108*a-b* may or may not be attached to the gaming machine (e.g., via bolting or other fasteners or adhesives).

A wire may be coupled between a gaming machine and an auxiliary unit 108*a-b*, for example, by (1) assembling the wire (e.g., placing appropriate connectors on each end of the wire), (2) locating a communication path inside the gaming machine, (3) coupling the wire to the communication path (e.g., by splicing into the path or by coupling to a communications port of the gaming machine such as the communications port 204 of the gaming machine 104*c* of FIG. 2), (4) threading the wire through a hole in the case of the gaming machine and/or (5) coupling the wire to the auxiliary unit 108*a-b* (e.g., to the communications port 304 of the auxiliary unit 108*a* of FIG. 3). Other techniques may be employed.

Input devices, output devices and/or sensors of an auxiliary unit 108*a-b* may be installed at or near a gaming machine separately or as a unit. For example, a camera or motion sensor (e.g., for detecting reel spinning/position), may be installed on a display (e.g., glass) of a gaming machine, such as is shown by the first sensor 314*a* and the reel 502 of FIG. 5B. A microphone, camera or other similar device (e.g., for receiving audio and/or video of a gaming machine player for determining game play information or for providing communications services, such as speaker phone service during game play) may be installed at or near a top of a gaming machine, as shown by the second sensor 314*b* of FIG. 5B. Likewise, other types of communications devices, such as a telephone, may be installed at or near a side of a gaming machine. Each such installation may involve one or more of (1) connecting one or more wires to an input device, an output device or a sensor; (2) connecting the one or more wires to an auxiliary unit 108*a-b*; and/or (3) attaching the input device, output device and/or sensor to a gaming machine (or locating the input device, output device and/or sensor near the gaming machine).

In at least one embodiment of the invention, any wire that extends from an input device, an output device and/or a sensor may be routed so as to protect the wire from tampering (e.g., by a gaming machine player). For example, wires may be routed through both a gaming machine and an auxiliary unit 108*a-b* coupled to the gaming machine. Also, wires may be coated with a tamper resistant material such as a steel sheath (e.g., to prevent cutting with wire or bolt cutters).

Any appropriate tools required to retrofit a gaming machine with an auxiliary unit 108*a-b* in accordance with the invention may be employed and/or provided with an auxiliary unit. For example, to open a gaming machine, a key that unlocks an access panel of the gaming machine, a screwdriver, a wrench, pliers, a rivet puller or the like may be provided. To alter a case of a gaming machine (e.g., for attaching an auxiliary unit 108*a-b*, for routing wires between the gaming machine and an auxiliary unit 108*a-b*, etc.), a drill and/or drill bit, sheet metal cutters, a file, a screwdriver, a wrench, pliers, a rivet gun, a clamp or the like may be provided. Sheet metal, screws, nuts and bolts, rivets, glue, solder, epoxy, a soldering iron or gun, etc., may be provided to facilitate such gaming machine case alteration and/or attachment of an auxiliary unit 108*a-b* thereto.

To install and route wires between a gaming machine and an auxiliary unit 108*a-n*, wire cutters, wire strippers, a crimper, a soldering iron or gun, etc., may be provided; as may be wire, cable (e.g., insulated, shielded and/or of appropriate gage), connectors, solder, etc. As stated, a kit including one or more of the above tools/parts, as well as other similar tools/parts, may be included with an auxiliary unit 108*a-b* to facilitate retrofitting of a gaming machine in accordance with the present invention.

Accordingly, while the present invention has been disclosed in connection with exemplary embodiments thereof, it should be understood that other embodiments may fall within the spirit and scope of the invention as defined by the following claims.

The invention claimed is:

1. A method of operating a system, the system including a gaming device incapable of providing personal communications services and an auxiliary unit including a communications device capable of providing the personal communications services, said method comprising:

(a) for a play of a wagering game by a player on the gaming device, causing a gaming device processor to execute a plurality of gaming device instructions stored in a gaming device memory device to:

(i) operate with a display device to display said play of the wagering game, (ii) determine an outcome for said play of the wagering game, and (iii) operate with the display device to display said determined outcome for said play of the wagering game; and (b) for said play of the wagering game by the player, causing an auxiliary unit processor to execute a plurality of auxiliary unit instructions stored in an auxiliary unit memory device to operate with the gaming device to:

(i) receive, from the gaming device, data associated with said play of the wagering game;

(ii) determine, based on said received data, whether to provide the personal communications services to the player, the personal communications services being email services; and (iii) if the auxiliary unit processor determines to provide the personal communications services to the player, provide the personal communications services to the player, wherein the auxiliary unit processor is separate from the gaming device processor, the plurality of auxiliary unit instructions are different from the plurality of gaming device instructions, and the auxiliary unit memory device is separate from the gamine device memory device.

2. The method of claim 1, wherein the gaming device processor and the gaming device memory device are contained within a first housing and the auxiliary unit processor and the auxiliary unit memory device are contained within a second different housing.

3. The method of claim 1, which includes causing the at least one auxiliary unit processor to execute the plurality of auxiliary unit instructions to operate with at least one peripheral device to determine at least one characteristic of the player's game play.

4. The method of claim 3, wherein causing the at least one auxiliary unit processor to execute the plurality of auxiliary unit instructions to operate with at least one peripheral device to determine the at least one characteristic includes causing the at least one auxiliary unit processor to execute the plurality of auxiliary unit instructions to operate with the at least one peripheral device to observe the gaming device and to determine the at least one characteristic based on said observation.

5. The method of claim 4, wherein the at least one peripheral device includes an image capture device.

6. The method of claim 5, wherein the image capture device is a still camera.

7. The method of claim 5, wherein the image capture device is a video camera.

8. The method of claim 5, wherein the image capture device comprises a wager detector configured to detect payment at the gaming device.

9. The method of claim 5, wherein the image capture device is configured to detect a presence of the player at the gaming device.

10. The method of claim 4, wherein the at least one peripheral device includes at least one sensor.

11. The method of claim 3, wherein causing the at least one auxiliary unit processor to execute the plurality of auxiliary unit instructions to operate with at least one peripheral device to determine the at least one characteristic includes causing the at least one auxiliary unit processor to execute the plurality of auxiliary unit instructions to operate with the at least one peripheral device to determine the at least one characteristic without receiving any data associated with the at least one characteristic from the gaming device.

12. The method of claim 3, wherein the at least one peripheral device comprises an outcome detector configured to detect an outcome of a game play at the gaming device.

13. The method of claim 12, wherein the outcome detector comprises a video camera configured to detect an outcome of a game play at the gaming device.

14. The method of claim 12, wherein the outcome detector is configured to couple to a payment area of the gaming device and to detect a payment made at the payment area.

15. The method of claim 3, wherein the at least one peripheral device comprises a wager detector configured to detect payment at the gaming device.

16. The method of claim 1, which includes, if the auxiliary unit processor determines to provide the personal communications services to the player, causing the auxiliary unit processor to execute the plurality of auxiliary unit instructions to provide a unique identifier to the player, the unique identifier configured to enable use of the personal communications services.

17. The method of claim 16, wherein the unique identifier is an access code.

18. The method of claim 17, wherein the access code is printed on a substrate.

19. The method of claim 18, wherein the substrate comprises a receipt.

20. The method of claim 18, wherein the substrate is printed at the auxiliary unit.

21. The method of claim 18, wherein the substrate is printed at the gaming device.

22. The method of claim 18, wherein the substrate comprises a certificate redeemable for the personal communications services.

23. The method of claim 1, wherein the personal communications services are limited based on at least one second characteristic of the player's game play.

24. The method of claim 23, wherein the at least one second characteristic of the player's game play includes a rate of play by the player.

25. The method of claim 23, wherein the at least one second characteristic of the player's game play includes a rate of play by the player falling below a predetermined rate subsequent to the player receiving the personal communications services.

26. A system comprising:

(a) a gaming device incapable of providing personal communications services, the personal communications services being email services, the gaming device including:

(i) a gaming device processor;

(ii) a display device;

(iii) an input device; and (iv) a plurality of gaming device instructions stored in a gaming device memory device which, when executed by the gaming device processor, cause the gaming device processor to operate with the display device and the input device, for a play of a wagering game by a player, to:

(A) display said play of the wagering game, (B) determine an outcome for said play of the wagering game, and (C) display said determined outcome for said play of the wagering game; and (b) an auxiliary unit configured to communicate with the gaming device, the auxiliary unit including a communications device capable of providing the personal communications services to the player, the auxiliary unit including:

(i) an auxiliary unit processor separate from the gaming device processor; and (ii) a plurality of auxiliary unit instructions stored in an auxiliary unit memory device, the plurality of auxiliary unit instructions being different from the plurality of gaming device instructions and the auxiliary unit memory device being separate from the gaming device memory device, wherein the plurality of auxiliary unit instructions, when executed by the auxiliary unit processor, cause the auxiliary unit processor to operate with the gaming device, for said play of the wagering game by the player, to:

(A) receive, from the gaming device, data associated with said play of the wagering game;

(B) determine, based on said received data, whether to provide the personal communications services to the player; and (C) if the auxiliary unit processor determines to provide the personal communications services to the player, provide the personal communications services to the player.

* * * * *

UNITED STATES PATENT AND TRADEMARK OFFICE

CERTIFICATE OF CORRECTION

PATENT NO. : 8,177,645 B2
APPLICATION NO. : 11/456459
DATED : May 15, 2012
INVENTOR(S) : Jay S. Walker et al.

It is certified that error appears in the above-identified patent and that said Letters Patent is hereby corrected as shown below:

IN THE CLAIMS

In Claim 4, Column 17, Line 28, between “with” and “at” insert --the--.
In Claim 11, Column 17, Line 61, between “with” and “at” insert --the--.
In Claim 13, Column 18, Line 5, replace “an” with --the--.
In Claim 13, Column 18, Line 6, replace “a” with --the--.

Signed and Sealed this
Sixteenth Day of October, 2012

David J. Kappos
*Director of the United States Patent and Trademark Office*